(12) United States Patent
Hentunen et al.

(10) Patent No.: US 6,177,738 B1
(45) Date of Patent: Jan. 23, 2001

(54) ISOLATED ELECTRICAL SYSTEM INCLUDING ASYNCHRONOUS MACHINE WITH PRIME MOVER AND INVERTER/RECTIFIER

(75) Inventors: Erkki Hentunen, Helsinki; Tero Multanen, Rauma, both of (FI)

(73) Assignee: ABB Industry Oy, Helsinki (FI)

(*) Notice: Under 35 U.S.C. 154(b), the term of this patent shall be extended for 0 days.

(21) Appl. No.: 09/254,702

(22) PCT Filed: Sep. 9, 1997

(86) PCT No.: PCT/FI97/00538
§ 371 Date: Mar. 11, 1999
§ 102(e) Date: Mar. 11, 1999

(87) PCT Pub. No.: WO98/11643
PCT Pub. Date: Mar. 19, 1998

(30) Foreign Application Priority Data
Sep. 11, 1996 (FI) .................................................. 963585

(51) Int. Cl.[7] ................................................. H02J 9/00
(52) U.S. Cl. .................................. 307/67; 307/64; 322/39
(58) Field of Search .............................. 307/67, 9.1, 43, 307/64, 65, 68, 84; 322/39, 45; 318/148

(56) References Cited

U.S. PATENT DOCUMENTS

| | | |
|---|---|---|
| 4,007,407 | 2/1977 | Kranert . |
| 4,330,743 | 5/1982 | Glennon . |
| 4,883,973 | 11/1989 | Lakey et al. . |
| 5,267,134 * | 11/1993 | Banayan ................................. 363/40 |
| 5,587,647 * | 12/1996 | Bansal et al. .......................... 322/45 |

FOREIGN PATENT DOCUMENTS

| | | |
|---|---|---|
| 0 257 385 | 3/1988 | (EP) . |
| 0 378 085 | 7/1990 | (EP) . |
| 0 536 876 A1 | 4/1993 | (EP) . |

* cited by examiner

*Primary Examiner*—Josie Ballato
*Assistant Examiner*—Robert L Deberadinis
(74) *Attorney, Agent, or Firm*—Dykema Gossett PLLC

(57) ABSTRACT

An electrical system for use in isolation, the electrical system comprising a main engine (14), such as a gas turbine or a diesel engine, a generator (13) driven by the main engine (14) for generating a first alternating voltage (19), a first rectifier unit (12) for converting the first alternating voltage (19) generated by the generator (13) into a direct voltage on a DC bus (18), and at least one inverter unit (10, 15) for converting the direct voltage of the DC bus (18) into a second alternating voltage (20). The generator (13) driven by the main engine (14) for generating the first alternating voltage (19) is an asynchronous machine coupled directly to the shaft of the main engine (14), and the first rectifier unit (12) also comprises an inverter part for converting the direct voltage of the DC bus (18) into an alternating voltage with an adjustable frequency to said asynchronous machine (13) so as to use the machine as a motor.

10 Claims, 1 Drawing Sheet

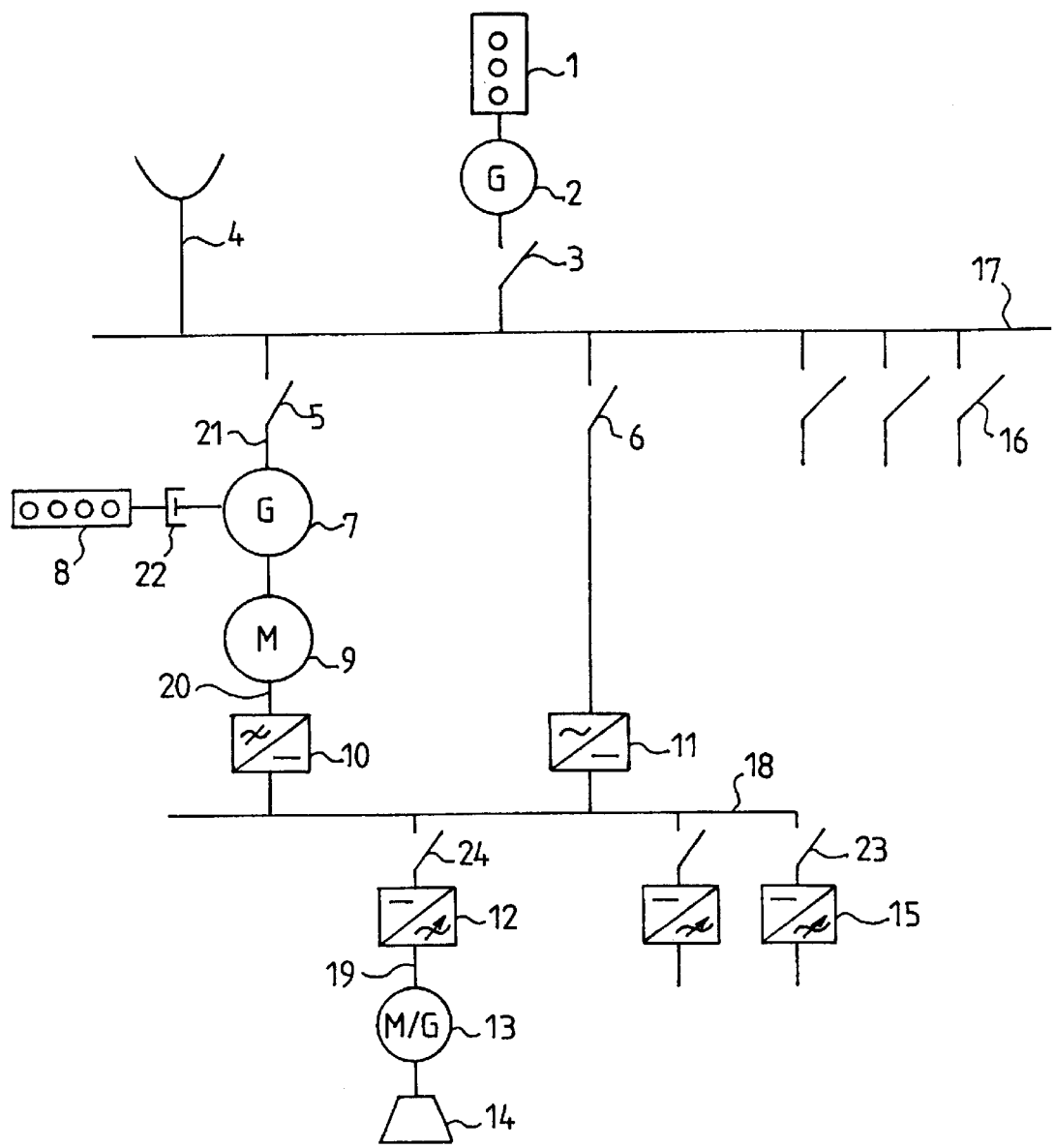

ISOLATED ELECTRICAL SYSTEM INCLUDING ASYNCHRONOUS MACHINE WITH PRIME MOVER AND INVERTER/RECTIFIER

BACKGROUND OF INVENTION

The invention relates to an electrical system for use in isolation, the system comprising a main engine, such as a gas turbine or a diesel engine, a generator driven by the main engine for generating a first alternating voltage, a first rectifier unit for converting the first alternating voltage generated by the generator into a direct voltage on a DC bus, and at least one inverter unit for converting the direct voltage on the DC bus into a second alternating voltage.

In accordance with the above, the invention relates to an electrical system for use in isolation, which means, for example, an electrical system of a ship or some other station, for example one located in a desert, isolated from other electric networks. An above type of electrical system for a ship is known, for example, from European Patent 97,185. The publication teaches the use of a synchronous generator as a shaft generator driven by the shaft of the main engine, the synchronous generator supplying power to two electric networks. In one network, the voltage and frequency are determined by the voltage and frequency of the shaft generator, i.e. they are directly dependent on the rotation speed of the ship's main engine. To the other electric network, power is supplied by an AC inverter arrangement, which comprises a rectifier circuit and an inverter circuit, by which is generated an alternating voltage with a constant amplitude and frequency. The two separate electric networks are used so that the ship's primary actuators, such as motors, pumps, compressors, ventilating and cooling systems, etc. obtain the power supply directly from the network that is being fed by the synchronous generator, whereas the electric power required by radio equipment, navigation systems and lighting is obtained via the AC inverter arrangement.

The above-described known system has some defects. For example, a separate energizing circuit and a separate electric motor have to be arranged so as to be able to start the main engine. Another major problem may arise when the electricity produced by the inverter system is not necessarily of high quality, i.e. it contains harmonic waves, which are harmful in many applications. Also, in case of main engine failure, the system is also too vulnerable, if there are no auxiliary engines or arrangements by which the ship's propeller can be driven even in case of such main engine failure.

U.S. Pat. Nos. 4,883,973 and 4,330,743, respectively, teach an electrical system for a vehicle and an aircraft. In both systems, the same electric machine is used both as a motor when the main engine, i.e. the motor of the vehicle or aircraft, is started, and as a generator generating electric power to the electrical system after the motor has started. In U.S. Pat. No. 4,883,973, the motor is an asynchronous machine that is coupled to the vehicle's motor through a bimodal gear set. The gear set operates as a reduction drive during the starting mode and as a direct drive during the generating mode. When the vehicle's motor is being started, the rotary speed of the asynchronous machine has to be registered by a tachometer so as to effect feedback control in the inverter arrangement controlled by a computer-based controller feeding the asynchronous machine, so that the arrangement can maintain the desired voltage/frequency ratio in the output voltage. The motor used in the electrical aircraft system disclosed in U.S. Pat. No. 4,330,743 is a synchronous machine coupled to an aircraft engine via a drive unit containing a hydraulic torque converter. When the aircraft engine is being started, the synchronous machine is used as a motor, whereby the inverter unit feeding the synchronous machine needs data on the position of the rotor. When the aircraft engine is being started, the synchronous machine operates as a motor, and its speed is at first raised to the operating speed. After this, the hydraulic torque converter is used to accelerate the aircraft engine gradually to a desired speed so as to start the engine.

Although U.S. Pat. Nos. 4,883,973 and 4,330,743 teach the use of one and the same electric machine both as a motor when the main engine is being started and as a generator when the main engine is running, expensive and clumsy electrotechnical control arrangements are needed particularly for the use as a motor in the arrangement of both publications, the control arrangements comprising a tachometer or a rotor position transmitter, and torque converter and gear arrangements. The torque converter and gear arrangements used are such that they cannot be applied reasonably to transmission of high power, such as megawatts. Also, the operation of the electrical systems known from the two publications is based on direct voltage supply obtained, for example, from a battery. This sets certain limitations to application of these systems.

BRIEF DESCRIPTION OF INVENTION

The object of the present invention is to provide an electrical system which is designed for use in isolation and in which the defects and problems of the above-described known systems are overcome. This is achieved with an electrical system according to the invention, which is characterized in that the generator driven by the main engine for generating the first alternating voltage is an asynchronous machine coupled directly to the shaft of the main engine, and that the first rectifier unit also comprises an inverter part for converting the direct voltage of the DC bus into an alternating voltage with an adjustable frequency to said asynchronous machine so as to use the machine as a motor. Depending on the structure of the rest of the system, there are several partly alternative reasons for the use of said asynchronous machine as a motor. For example, when the machine is used as a motor, the gas turbine used as the main engine can be started, or the ship's propeller shaft can be driven as a "take-me-home" motor in case of main engine failure, irrespective of whether the main engine is a gas turbine or a diesel engine.

When the asynchronous machine is used as a shaft generator coupled to the shaft of the main engine, a situation arises in which one and the same machine is used both as a motor starting the gas turbine which is used as a main engine, and as a generator generating electric power from the shaft of the main engine. This simplifies the system, and the number of components needed is reduced. Further, the asynchronous machine, such as a squirrelcage induction motor, is much cheaper than a synchronous motor, and needs substantially less servicing.

The electrical system of the invention can be designed to further comprise a diesel engine/synchronous generator combination for generating a third alternating voltage on an AC bus, and a second rectifier unit for converting the third alternating voltage into a direct voltage on said DC bus so that it can be further converted in the inverter part of the first rectifier unit into an alternating voltage to said asynchronous machine when the machine is used as a motor. In the system of the invention, any auxiliary electricity needed, for example, for starting the main engine can be generated by means of the diesel engine/synchronous generator combination. Further, when necessary, for example in case of main engine failure, the system allows generation of electric power that can supply both the ship's other electric network and the electric motor coupled to the shaft of the main engine by the above-described arrangement, and so the ship's propeller can also be driven in this way, although only at a low rotary speed. The result, however, is a "take me home" arrangement.

The electrical system of the invention can be designed to further comprise an electric motor mechanically arranged to run with the shaft of the synchronous generator, the electric motor being arranged to receive the second alternating voltage generated by the inverter unit and to drive the synchronous generator so as to make it generate said third alternating voltage on the AC bus; and a switch arranged on the shaft between the parts of said diesel engine/synchronous generator combination so as to isolate the synchronous generator from the diesel engine after the load of the synchronous generator has been transferred from the diesel engine to said electric motor.

A similar arrangement in which the synchronous generator originally driven by the diesel engine is arranged to be driven by the electric motor allows the use of diesel engines only as auxiliary engines when the main engine, exceptionally, is not in use. Another consequence of this kind of arrangement is that the voltage supplied on the AC bus is generated by a separate synchronous generator and is therefore not electricity generated by an inverter arrangement, which means, for example, that it is free of any harmonic waves.

BRIEF DESCRIPTION OF FIGURES

In the following the electrical system of the invention and the advantages provided by it will be described in greater detail with reference to the attached drawing, which shows a general switching diagram of an embodiment of the electrical system according to the invention, shown by way of an example.

DETAILED DESCRIPTION OF INVENTION

In the following the electrical system according to the invention illustrated in the figures of the attached drawing will be described in a situation where the electrical system concerned is not yet in operation, i.e. its main engine 14 has not been started yet. In this kind of starting situation, at least one of diesel engines 1 and 8 is first started. The diesel engines, respectively, drive synchronous generators 2 and 7, by which alternating electricity is generated to a main panel or on an AC bus 17. Where a ship is concerned, the electricity generated by the diesel engine/synchronous generator combinations can also be replaced with mains supply, which is indicated by reference number 4 in the figure. The diesel engine/synchronous generator combinations 8, 7 and 1, 2 are coupled to the AC bus 17 via switches 5 and 3, respectively.

When the main engine 14 is to be started, a switch 6 by which the voltage of the AC bus 17 is connected to the rectifier unit 11 is closed, the rectifier unit converting the alternating voltage of the AC bus 17 into a direct voltage on a DC bus 18. The figure shows some inverter units 10 and 15 connected to the DC bus 18, the inverter units being used in generating alternating voltages of a desired frequency for other purposes. This will be discussed in greater detail below. To the DC bus 18 is also connected an inverter unit 12 via a switch 24 to generate an alternating voltage 19 with an adjustable frequency, the alternating voltage being supplied to an asynchronous machine 13, which here functions as an electric motor. The shaft of the electric motor 13 is mechanically connected to rotate with the shaft of the main power machine 14. The connection is a direct one, i.e. it does not contain any kind of gearing or switch. The main engine 14 can be, for example, a gas turbine or a large diesel engine.

As the shaft of the gas turbine used as the main engine 14 is being driven by the electric motor 13, the gas turbine will be started. In connection with the drive-up, the frequency of the alternating voltage generated by the inverter unit 12 is controlled to rise in accordance with a suitable ramp, so that the electric motor 13 can be used, irrespective of the frequency, with a suitable slip. When the main engine is a diesel engine, it is started by common procedures, for example with compressed air. When the main engine 14 is running and the rotary frequency of the motor 13 rises above the frequency of the alternating voltage generated by the inverter unit 12, the asynchronous machine 13 takes up the role of a generator and starts to supply power back to the DC bus 18 via the inverter unit 12, which has now been controlled to work as a rectifier. The alternating voltage generated by the generator 13 is adjusted by the inverter unit 12 by changing the slip. The rotary speed of the generator 13 can then vary widely without that this would have an effect on the level of the direct voltage rectified by the inverter unit 12 on the DC bus 18. The DC bus 18 is then supplied both from the AC bus 17 and from the generator 13.

The next step is to start an electric engine 9 coupled to the DC bus 18 via the inverter unit 10, the electric motor being mechanically connected to rotate with the shaft of the synchronous generator 7 of the diesel engine/synchronous generator combination 8, 7. The load of the generator 7 is then transferred from the diesel engine 8 to the electric motor 9, whereby a switch 22 arranged on the shaft between the diesel engine 8 and the synchronous generator 7 can be opened. The synchronous generator 7, driven by the electric motor 9, then generates an alternating voltage 21 on the AC bus 17. When the diesel engine 8 is disconnected from the synchronous generator 7 by switch 22, the engine can be stopped. The diesel engine 1 and the synchronous generator 2 driven by it can also be stopped and disconnected from the AC bus 17 by switch 3. The diesel engine/synchronous generator combination 1, 2 is connected to the system primarily to produce redundancy: it is not absolutely necessary for providing the most essential operations of the system according to the invention. Naturally, in case of main engine failure and maybe even diesel engine 8 failure, the ship's electrical system could be kept in operation and the electric motor 13 could be supplied by the diesel engine/synchronous generator combination 1, 2, and so the above-mentioned "take-me-home" arrangement could also be achieved in this way.

Returning now to the above-described situation where switch 3 is open, switch 6, through which the electric power was supplied from the AC bus 17 to the DC bus 18 during the starting mode, can next be also opened. In continuous normal use, the whole electric power of the system—whether the system is a ship or for example a desert station—is here obtained from the generator 13 driven by the main engine 14, and no other diesel aggregates need to be used. If, however, the inverter system 12 or the generator 13 malfunctioned, the diesel engines 1 and 8 would be prepared to supply the power needed by the AC and DC buses after a period needed for starting the diesels. Other consumers connected to the same plant can be connected to the AC bus, for example via switches 16, and to the DC bus 18, for example via inverter units 15 connected by switches 23. The "large" engines can be started at their nominal current by the inverter units 15.

The major advantage provided by the electrical system of the invention is that the generator supplying the system and the motor starting the gas turbine main engine is one and the same asynchronous machine, typically a normal squirrel-cage induction motor, which is cost-effective and has a simple structure, small size and long life-span. The asynchronous machine is coupled directly to the shaft of the main engine, and no gear or switch arrangements are needed. The basis for this is that any necessary adjustments, a frequency adjustment of the supply voltage when the asynchronous machine functions as a motor and a voltage adjustment of the rectifier bus when the asynchronous machine functions as a generator, can be performed electrically using the inverter unit 12. As stated above, the asynchronous machine 13 can also function as a "take-me-home" motor or in some other use where it takes up, at least in part, the function of the main engine. When the electrical system is used normally, auxiliary diesels need not be driven at all, and so the efficiency of the whole system is improved and less servicing is needed. The operation of the electrical system can be controlled automatically; the staff need not take any measures. Further, the voltage of the AC bus is free of harmonic waves in normal use, since it is supplied by the synchronous generator 7 driven by the motor 9.

The electrical system of the invention is described above only by one embodiment, by way of an example, and it is to be understood that the system can be extended and varied in many ways without deviating from the scope of the attached claims.

What is claimed is:

1. An electrical system for use in isolation, the electrical system comprising a main engine, said main engine being at least one of a gas turbine or a diesel engine, a generator driven by the main engine for generating a first alternating voltage, a first rectifier unit for converting the first alternating voltage generated by the generator into a direct voltage on a DC bus, and at least one inverter unit for converting the direct voltage of the DC bus into a second alternating voltage, wherein the generator driven by the main engine for generating the first alternating voltage is an asynchronous machine coupled directly to the shaft of the main engine, and that the first rectifier unit also comprises an inverter part for converting the direct voltage of the DC bus into an alternating voltage with an adjustable frequency to said asynchronous machine so as to use the machine as a motor.

2. An electrical system according to claim 1, further comprising a diesel engine/synchronous generator combination for generating a third alternating voltage on an AC bus, and a second rectifier unit for converting the third alternating voltage into a direct voltage on said DC bus, so that it can be further converted in the inverter part of the rectifier unit into an alternating voltage to said asynchronous machine when the machine is used as a motor.

3. An electrical system according to claim 2, further comprising an electric motor mechanically arranged to rotate with the shaft of the synchronous generator, the motor being arranged to receive the second alternating voltage generated by the inverter unit and to drive the synchronous generator so as to make it generate said third alternating voltage on the AC bus; and a switch arranged on the shaft between the parts of said diesel engine/synchronous generator combination so as to isolate the synchronous generator from the diesel engine after the load of the synchronous generator has been transferred from the diesel engine to said electric motor.

4. An electrical system comprising:

a first engine for producing mechanical power;

a first asynchronous motor-generator driven by the first engine and operating as a generator for generating a first alternating voltage and for receiving a second alternating voltage for operating as a motor;

a first rectifier unit for converting the first alternating voltage into a direct voltage;

an inverter for converting the direct voltage into a second alternating voltage for driving said first generator as a motor, said second alternating voltage being adjustable; and at least one inverter unit for converting the direct voltage into a second alternating voltage.

5. An electrical system according to claim 4, wherein the main engine comprises at least one of a gas turbine and a diesel engine.

6. An electrical system according to claim 4, further comprising a second engine and a second generator responsive to the second motor-engine for generating a third alternating voltage.

7. An electrical system according to claim 6, further including a second rectifier unit for converting the third alternating voltage into a direct voltage, said inverter being responsively coupled thereto for converting the third alternating voltage for driving said second asynchronous motor-generator as a motor.

8. An electrical system according to claim 7, further including an AC bus for receiving the AC voltages and a DC bus for receiving the DC voltages.

9. An electrical system according to claim 4, including a switch arranged between said engine and said motor-generator combination so as to isolate the motor generator from the engine when the motor-generator operates as a motor.

10. An electrical system for use in isolation, the electrical system comprising:

a main engine, said main engine being at least one of a gas turbine or a diesel engine;

a generator driven coupled directly to the shaft of the main engine for generating a first alternating voltage, said generator is also an asynchronous machine capable of receiving alternating voltage from an inverter with an adjustable frequency and being a motor supplying power;

a first rectifier unit for converting the first alternating voltage generated by the generator into a direct voltage on a DC bus, the first rectifier unit comprising an inverter for converting the direct voltage of the DC bus into an alternating voltage with an adjustable frequency to the asynchronous machine so as to use the machine as a motor, and said inverter for converting the direct voltage of the DC bus into a second alternating voltage, wherein said motor is capable of being used irrespective of the frequency of the alternating voltage generated by the inverter.

* * * * *